Feb. 7, 1933.  C. R. PATON  1,896,969
VIBRATION DAMPING DEVICE
Filed Nov. 28, 1930
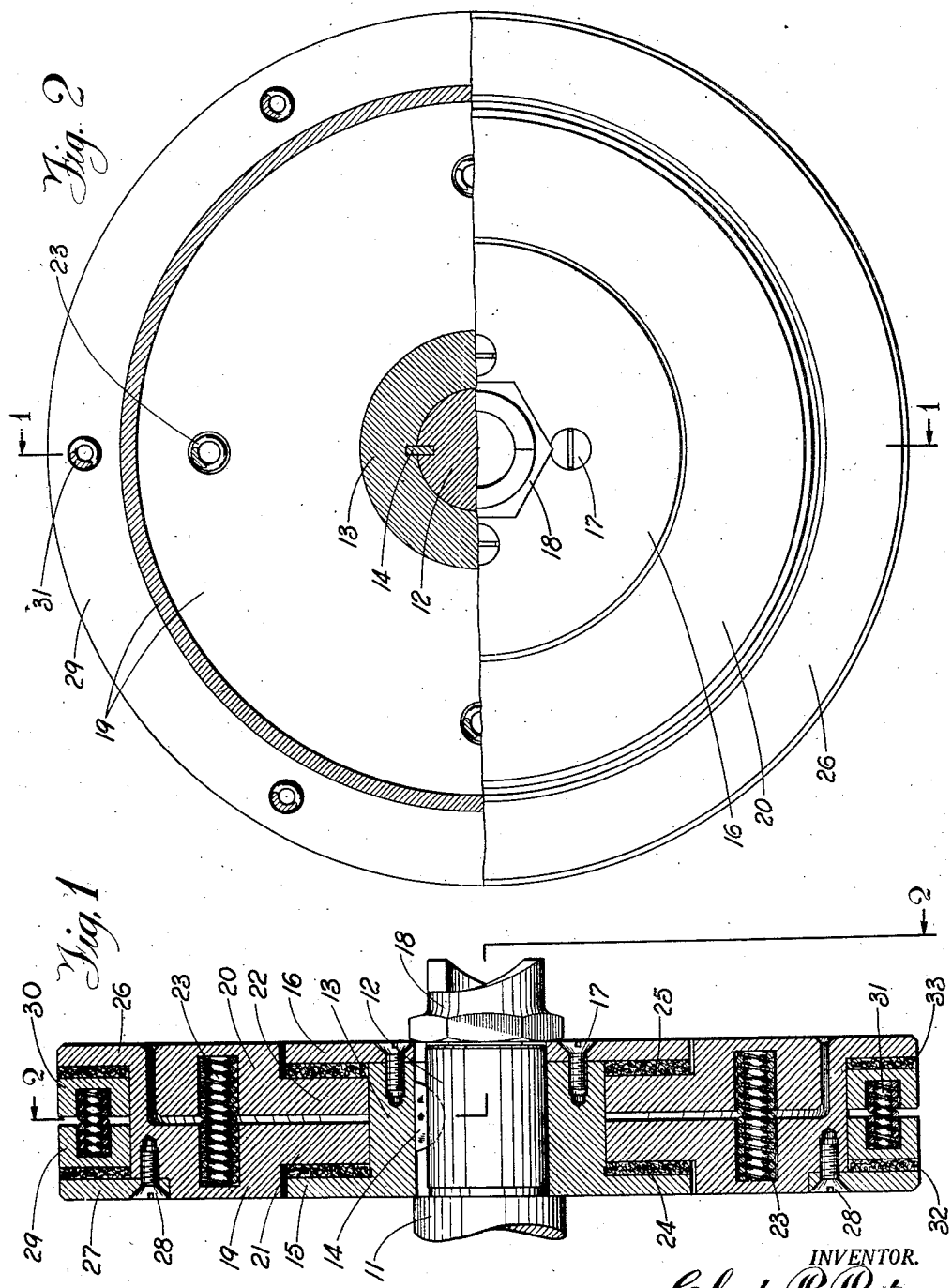
INVENTOR.
Clyde R. Paton
BY
ATTORNEY Patented Feb. 7, 1933

1,896,969

UNITED STATES PATENT OFFICE

CLYDE R. PATON, OF BIRMINGHAM, MICHIGAN, ASSIGNOR TO THE STUDEBAKER CORPORATION, OF SOUTH BEND, INDIANA, A CORPORATION OF NEW JERSEY

VIBRATION DAMPING DEVICE

Application filed November 28, 1930. Serial No. 498,709.

This invention relates to the dampening of torsional shaft vibrations and more particularly to vibrations of this nature which are encountered in internal combustion engines.

During the operation of internal combustion engines, the crank shaft is subject to certain natural periodic vibrations, the characteristics of the vibrations varying according to the design of the shaft, to its mounting, and to other influences. At certain critical engine speeds, the explosions or power impulses will occur in phase with the natural vibrations of the shaft, resulting in marked torsional vibrations the amplitude of which frequently builds up to dangerous proportions. Usually the design of the crank shaft and associated parts is such that synchronization of this sort will take place at several critical speeds within the operative speed range of the shaft, and the amplitude of the resulting vibrations may reach destructive proportions at more than one such critical speed.

It is an object of the invention to dampen torsional vibrations generated during the operation of rotating shafts.

It is a further object to absorb torsional vibrations set up in the crank shafts of internal combustion engines.

Another object comprises means for dampening torsional vibrations occurring in rotating shafts, which means may operate effectively at several critical speeds of rotation.

Another object resides in the absorption of torsional vibrations by mounting on a shaft adapted for rotation, a body mounted to slip relative to the shaft under certain operating conditions in order to absorb or dampen such vibrations.

A more specific object resides in the provision of means mounted on a rotative shaft, and adapted to present different inertia resistances at different critical shaft speeds.

A further specific object consists in providing on a shaft adapted for rotation and subject to cumulative torsional vibrations at different critical speeds, means designed to slip at different critical speeds of rotation in order to present different inertia resistances at different critical speeds.

Other objects will be disclosed in the description of a form of the invention illustrated in the drawing.

Referring to the drawing:

Fig. 1 illustrates a section taken along lines 1—1 of Fig. 2, and

Fig. 2 shows a front elevation partially in section of one form of the invention, the partial section being indicated by lines 2—2 of Fig. 1.

In the drawing which is to be taken as illustrative only and not as limiting the scope of the invention in any way, there is shown the crank shaft 11 of an internal combustion engine, having a reduced portion 12, preferably the end of the shaft opposite to that on which the fly wheel is mounted. On this reduced portion is non-rotatably mounted an annular member 13 by means of key 14, member 13 being formed with an integral circular flange 15 at the inner side thereof, and having a removable circular flange 16 of an outer diameter equal to that of flange 15. Flange 16 is fastened to annulus 13 by means of screws 17, and the member 13 is held free from axial movement on the shaft by means of nut 18.

Upon the member 13, and between flanges 15 and 16, are mounted members 19 and 20, having axially reduced inner portions 21 and 22 respectively, the inner diameters of sections 19 and 20 being approximately equal to the diameter of the annular member 13, but having sufficient clearance to permit rotation thereon. The members 19 and 20 are yieldably spaced axially from each other by means of coiled springs 23 mounted circumferentially and at intervals in registering recesses in the adjacent sides of the members, the outer faces of the reduced portions 21 and 22 being pressed against rings 24 and 25 of suitable frictional material which frictionally engage the inner faces of flanges 15 and 16 and the outer faces of portions 21 and 22. Member 19 is formed at its outer periphery with an integral flange 26 and with a removable flange 27 fastened thereto by screws 28.

Within the groove formed between flanges 26 and 27 are mounted ring members 29 and 30, having a sliding fit at their inner diameters with member 19, and being axially spaced by means of springs 31 set circumferentially and at intervals in opposed registering pockets in the inner surfaces of members 29 and 30, the springs forcing the ring members into engagement with rings 32 and 33 formed of frictional material, which are adapted to frictionally engage the inner faces of flanges 26 and 27 and the outer faces of members 29 and 30.

The members 19 and 20 form a primary vibration dampener, the springs 23 adapted to press the members into frictional engagement with flanges 15 and 16, so as to cause rotation with the crank shaft, the members being adapted to slip at a certain critical speed of the crank shaft in order to dampen out the objectionable torsional vibrations. Members 29 and 30 form a secondary vibration dampener adapted to rotate with the crank shaft when the member 19 is rotating therewith but being adapted to slip at a critical speed which is different from that at which the members 19 and 20 slip.

The movement of inertia of members 19 and 20, the strength of springs 23, and the form and coefficient of friction of rings 24 and 25 are so designed as to cause slippage at a predetermined critical speed, and the resistance of inertia offered is so proportional that the energy generated by the torsional vibrations of the shaft at that speed is effectively absorbed and dissipated. The corresponding characteristics of members 29 and 30, springs 31, and friction rings 32 and 33, are so regulated as to cause a slippage of members 29 and 30 at a predetermined critical speed differing from that at which members 19 and 20 slip, and the resistance of inertia of members 29 and 30 is likewise proportioned to effect a proper dampening of the torsional oscillations occurring at its critical speed.

From the above description it will be evident that a satisfactory dampening of undesirable torsional vibrations may be effected at a number of critical speeds, and without substantially adding to the weight of the crank shaft assembly. Although the invention is described with respect to the dampening of vibrations occurring at two critical speeds, it will be understood that a third vibration dampening assembly may be mounted on ring 29, designed to slip at a third critical speed, or additional dampening assemblies may be mounted to take care of additional critical speeds.

I claim:

1. A vibration dampener for a rotary shaft comprising means frictionally associated with said shaft adapted to operate at a predetermined critical speed to absorb torsional vibration and a second means mounted upon said first means and frictionally associated therewith and adapted to operate at a different predetermined critical speed to absorb torsional vibration.

2. A vibration dampener for a rotary shaft comprising means adapted to be frictionally rotated by said shaft and to automatically slip in both directions relative to said shaft to absorb a predetermined range of torsional vibration, and a second means mounted upon said first means frictionally associated therewith adapted to be rotated by said shaft and to automatically slip relative to said shaft to absorb a different predetermined range of torsional vibration.

3. A vibration dampener for a rotary shaft comprising an inner member adapted to be rotated by the shaft, a second member adapted to be frictionally rotated by said inner member and to automatically slip relative thereto under predetermined conditions of shaft vibration, and a third member mounted upon said second member adapted to be frictionally rotated thereby and to slip relative thereto under different predetermined conditions of shaft vibration.

4. A vibration dampener for a rotary shaft comprising an inner member adapted to be rotated by the shaft, an intermediate member adapted to be frictionally rotated by said inner member and to slip relative thereto whenever torsional vibrations in said shaft are within predetermined range, and an outer member adapted to be frictionally rotated by said intermediate member and to slip relative thereto when the torsional vibrations in the shaft are within a different predetermined range.

5. A vibration dampener for a rotary shaft comprising an inner member mounted on said shaft, a second member having axially separated parts and having a frictional engagement with said inner member, resilient means for connecting the said parts and for forcing them into frictional engagement with the inner member, and an outer member having a frictional engagement with said second member.

6. A vibration dampener for a rotary shaft comprising an inner member mounted on said shaft, a second member frictionally mounted on said inner member, a third member having axially separated parts which frictionally engage the second member, resilient means for connecting said parts and for forcing them into frictional engagement with the second member.

7. A vibration dampener for a rotary shaft comprising an inner member non-rotatably mounted on said shaft, an intermediate member frictionally mounted on said inner member, an outer member having axially separated parts which frictionally engage the intermediate member, resilient means for connecting said parts and for forcing them into frictional engagement with the intermediate member.

8. A vibration dampener for a rotary shaft comprising an inner member non-rotatably mounted on said shaft, a second member angularly movable relative to said shaft having axially separated parts which frictionally engage the inner member, resilient means for connecting said parts and for forcing them into frictional engagement with the inner member, a third member having axially separated parts which frictionally engage the second member, said last named parts having resilient means which connect them and which force them into frictional engagement with the second member.

9. A vibration dampener for a rotary shaft comprising an inner member non-rotatably mounted on said shaft, a second member angularly movable relative to said shaft having axially separated parts which frictionally engage the inner member, resilient means for connecting said parts and for forcing them into frictional engagement with the inner member, a third member angularly movable relative to said second member and said shaft mounted on one of the parts of said second member having axially separated parts which frictionally engage the second member, said last named parts having resilient means which connect them and which force them into frictional engagement with the second member.

Signed by me at Birmingham, Michigan, this 21st day of November, 1930.

CLYDE R. PATON.